(12) United States Patent
Homma et al.

(10) Patent No.: US 11,275,875 B2
(45) Date of Patent: Mar. 15, 2022

(54) CO-SIMULATION REPEATER WITH FORMER TRACE DATA

(71) Applicant: Hitachi Automotive Systems, Ltd., Hitachinaka (JP)

(72) Inventors: Ichiki Homma, West Bloomfield, MI (US); Heming Chen, Novi, MI (US); Yuan Xiao, Northville, MI (US); Sujit S. Phatak, New Hudson, MI (US)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 748 days.

(21) Appl. No.: 16/234,205

(22) Filed: Dec. 27, 2018

(65) Prior Publication Data

US 2020/0210536 A1     Jul. 2, 2020

(51) Int. Cl.
  *G06F 7/62*   (2006.01)
  *G06F 30/20*  (2020.01)
  *G06F 21/10*  (2013.01)

(52) U.S. Cl.
  CPC ............ *G06F 30/20* (2020.01); *G06F 21/105* (2013.01); *G06F 2221/0704* (2013.01)

(58) Field of Classification Search
  CPC ...................................................... G06F 30/20
  USPC .......................................................... 703/13
  See application file for complete search history.

(56) References Cited

U.S. PATENT DOCUMENTS

| | | | |
|---|---|---|---|
| 6,263,302 B1 * | 7/2001 | Hellestrand | G06F 9/455 703/17 |
| 8,543,367 B1 * | 9/2013 | Van Rompaey | G06F 11/261 703/14 |
| 2018/0189165 A1 | 7/2018 | Yamada et al. | |
| 2019/0278698 A1 * | 9/2019 | Ahner | G06F 30/15 |

* cited by examiner

*Primary Examiner* — Timothy A Mudrick
(74) *Attorney, Agent, or Firm* — Procopio, Cory, Hargreaves & Savtich LLP

(57) ABSTRACT

Example implementations described herein are directed to systems and methods that include the storage of I/F communication activity during a co-execution and a repeater to reproduce such I/F communication activity. Thus in a subsequent re-execution of the simulation or applications, one or more of the simulations or applications utilized can be replaced with a repeater without requiring the full execution of the simulation or application, thereby saving license usage as well as requiring fewer hardware resources for execution.

18 Claims, 13 Drawing Sheets

Simulator license management table

| License | remaining |
|---|---|
| Simulator1 | 1 |
| Simulator2 | 1 |
| Simulator3 | 1 |
| ... | ... |

FIG. 2

Timing chart on co-simulation bus

| Sim time | Simulator1 | | Simulator2 | | Simulator3 | |
|---|---|---|---|---|---|---|
|  | 112 | 113 | 122 | 123 | 132 | 133 |
| 0 | S1o0 | s1i0 | S2o0 | s2i0 | S3o0 | s3i0 |
| 1 | S1o1 | s1i1 | S2o1 | s2i1 | S3o1 | s3i1 |
| 2 | S1o2 | s1i2 | S2o2 | s2i2 | S3o2 | s3i2 |
| ... | ... | ... | ... | ... | ... | ... |
| n | S1on | s1in | S2on | s2in | S3on | s3in |
| ... | ... | ... | ... | ... | ... | ... | t

FIG. 3

| Timing chart on I/F trace1 | | |
|---|---|---|
| | Simulator1 | |
| Sim time | 112 | 113 |
| 0 | S1o0 | s1i0 |
| 1 | S1o1 | s1i1 |
| 2 | S1o2 | s1i2 |
| ... | ... | ... |
| n | S1on | s1in |
| ... | ... | ... |

| Timing chart on I/F trace2 | | |
|---|---|---|
| | Simulator2 | |
| Sim time | 122 | 123 |
| 0 | S2o0 | s2i0 |
| 1 | S2o1 | s2i1 |
| 2 | S2o2 | s2i2 |
| ... | ... | ... |
| n | S2on | s2in |
| ... | ... | ... |

| Timing chart on I/F trace3 | | |
|---|---|---|
| | Simulator3 | |
| Sim time | 132 | 133 |
| 0 | S3o0 | s3i0 |
| 1 | S3o1 | s3i1 |
| 2 | S3o2 | s3i2 |
| ... | ... | ... |
| n | S3on | s3in |
| ... | ... | ... |

FIG. 5

Timing chart on I/F trace

| Sim time | Simulator1 | | Simulator2 | | Simulator3 | |
|---|---|---|---|---|---|---|
| | 112 | 113 | 122 | 123 | 132 | 133 |
| 0 | S1o0 | s1i0 | S2o0 | s2i0 | S3o0 | s3i0 |
| 1 | S1o1 | s1i1 | S2o1 | s2i1 | S3o1 | s3i1 |
| 2 | S1o2 | s1i2 | S2o2 | s2i2 | S3o2 | s3i2 |
| ... | ... | ... | ... | ... | ... | ... |
| n | S1on | s1in | S2on | s2in | S3on | s3in |
| ... | ... | ... | ... | ... | ... | ... | t ↓

FIG. 9

CO-SIMULATION REPEATER WITH FORMER TRACE DATA

BACKGROUND

Field

The present disclosure relates to simulation systems, and more specifically, to execution of simulation platforms from a license server.

Related Art

In complex automotive systems, such as advanced-driver-assistance-system (ADAS), there is a strong demand for optimization of the verification procedure for embedded software of the system.

One of the related art solutions for this demand is "co-simulation", a multi-domain simulation connecting various types of simulators which represent each part of the simulation target (e.g. electronics control unit (ECU), electronic circuit, mechanical plant, and so on). Such related art systems provide a virtual platform that can run embedded software and verify its behavior without using any real hardware, but rather utilizes the virtual environment on personal computers (PCs), so that software designers can check and verify the software fairness even before hardware platform development.

Meanwhile, software designers sometimes want to re-execute a previously executed simulation during software debugging, to reproduce software symptoms that occur in the previous execution. Such re-execution allows the engineer to check the symptoms and analyze which part of the software is wrong in case of a malfunction.

In such a case, to re-execute a previously executed simulation with the current co-simulation environment, designers must invoke all the simulators within the co-simulation platform, even when case designers want to debug only one of the target simulators in the co-simulation platform (e.g., only want to simulate ECU which executes control software but not the electric circuit or mechanical plant).

With these situations, the current co-simulation environment is inefficient in several areas, such as execution speed because all the simulators must be invoked during the co-simulation which leads to very heavy workload to the execution servers (ex. PC or VM), or such as license management because all the simulators require each specific license for the execution in case the simulators are 3rd-party products.

SUMMARY

To address the related art issues described above, the present disclosure is directed to a resolution for inefficiencies in execution speed and license usage with a former co-simulation platform, especially in the case of a re-execution of prior co-simulation.

The present disclosure involves a new method for such re-execution of co-simulation platform with more efficiency in both execution speed and license management to address the problems with the related art. In the new methodology, there are storage systems that record each value of Interface (I/F(s)) for each simulator in each time during the previous co-simulation, called "I/F trace", and there are dummy module(s) for each simulator in the co-simulation platform, which can reproduce the former I/F communication activity by using the preserved I/F trace, and which can replace the actual simulator in the re-execution term.

Further, at the re-execution term, the re-execution is conducted by replacing the simulators in the co-simulation platform with the dummy module(s) described above, except for the target simulator that software engineers want to analyze and/or debug. As described in the present disclosure, through the example implementations described herein, only one target simulator for debugging needs to be invoked again, and the rest of the simulators are replaced with repeaters during re-execution of the former co-simulation.

Such example implementations are an improvement to related art implementations, as the co-simulation execution speed can be improved because the simulator(s) other than the target simulator for debug is replaced with the dummy module which involves less workload than real simulators for the execution servers. Such example implementations result in faster execution of the simulation on the execution server without needing to change the hardware configuration of the server.

Further, the number of simulator license usages can be reduced, because the dummy module(s) replaced with the former co-simulation platform does not require such license during the re-execution term, which leads to a more effective co-simulation re-execution process than related art systems.

Aspects of the present disclosure involve a method, which can include storing interface (I/F) communication activity records of a plurality of simulation engines during execution of a co-simulation involving the plurality of simulation engines; and for a subsequent execution of the co-simulation, replacing one or more of the plurality of simulation engines with a simulation engine repeater configured to reproduce I/F communication activity from the stored I/F communication activity records corresponding to the replaced one or more of the plurality of simulation engines during the subsequent execution of the co-simulation.

Aspects of the present disclosure involve a computer program, which can include instructions for storing interface (I/F) communication activity records of a plurality of simulation engines during execution of a co-simulation involving the plurality of simulation engines; and for a subsequent execution of the co-simulation, replacing one or more of the plurality of simulation engines with a simulation engine repeater configured to reproduce I/F communication activity from the stored I/F communication activity records corresponding to the replaced one or more of the plurality of simulation engines during the subsequent execution of the co-simulation. The computer program can be stored on a non-transitory computer readable medium storing the instructions and executed by one or more processors.

Aspects of the present disclosure involve a system, which can include means for storing interface (I/F) communication activity records of a plurality of simulation engines during execution of a co-simulation involving the plurality of simulation engines; and for a subsequent execution of the co-simulation, means for replacing one or more of the plurality of simulation engines with a simulation engine repeater configured to reproduce I/F communication activity from the stored I/F communication activity records corresponding to the replaced one or more of the plurality of simulation engines during the subsequent execution of the co-simulation.

Aspects of the present disclosure involve a system, which can include a memory, configured to store interface (I/F) communication activity records of a plurality of simulation engines during execution of a co-simulation involving the plurality of simulation engines; and a processor, configured to, for a subsequent execution of the co-simulation, replace one or more of the plurality of simulation engines with a simulation engine repeater configured to reproduce I/F communication activity from the stored I/F communication activity records corresponding to the replaced one or more of the plurality of simulation engines during the subsequent execution of the co-simulation.

Aspects of the present disclosure can include a method, which can involve storing interface (I/F) communication activity records of a plurality of software applications that communicate with another software application over I/F during co-execution the plurality of software applications; and for a subsequent co-execution, replacing one or more of the plurality of software applications with a software application repeater configured to reproduce I/F communication activity from the stored I/F communication activity records corresponding to the replaced one or more of the plurality of software applications during the subsequent co-execution.

Aspects of the present disclosure can include a computer program, which can involve instructions for storing interface (I/F) communication activity records of a plurality of software applications that communicate with another software application over I/F during co-execution the plurality of software applications; and for a subsequent co-execution, replacing one or more of the plurality of software applications with a software application repeater configured to reproduce I/F communication activity from the stored I/F communication activity records corresponding to the replaced one or more of the plurality of software applications during the subsequent co-execution. The computer program can be stored on a non-transitory computer readable medium storing the instructions and executed by one or more processors.

Aspects of the present disclosure can include a system, which can involve means for storing interface (I/F) communication activity records of a plurality of software applications that communicate with another software application over I/F during co-execution the plurality of software applications; and for a subsequent co-execution, means for replacing one or more of the plurality of software applications with a software application repeater configured to reproduce I/F communication activity from the stored I/F communication activity records corresponding to the replaced one or more of the plurality of software applications during the subsequent co-execution.

Aspects of the present disclosure can include a system, which can involve a memory, configured to store interface (I/F) communication activity records of a plurality of software applications that communicate with another software application over I/F during co-execution the plurality of software applications; and a processor, configured to, for a subsequent co-execution, replace one or more of the plurality of software applications with a software application repeater configured to reproduce I/F communication activity from the stored I/F communication activity records corresponding to the replaced one or more of the plurality of software applications during the subsequent co-execution.

Aspects of the present disclosure can include a method, which can involve storing interface (I/F) communication activity records of a plurality of simulation engines during execution of a co-simulation involving the plurality of simulation engines, the communication activity records associated with a plurality of time stamps; for a subsequent execution of the co-simulation indicative of replacement of one or more of the plurality of simulation engines with a simulation engine repeater for a subset of the plurality of time stamps, replacing one or more of the plurality of simulation engines with a simulation engine repeater configured to reproduce I/F communication activity from the stored I/F communication activity records corresponding to the replaced one or more of the plurality of simulation engines during the subsequent execution of the co-simulation during a period of time indicated by the subset of the plurality of time stamps; and executing the one or more plurality of simulation engines during another period of time outside of the subset of the plurality of time stamps during the subsequent execution of the co-simulation.

Aspects of the present disclosure can include a computer program, which can involve instructions for storing interface (I/F) communication activity records of a plurality of simulation engines during execution of a co-simulation involving the plurality of simulation engines, the communication activity records associated with a plurality of time stamps; for a subsequent execution of the co-simulation indicative of replacement of one or more of the plurality of simulation engines with a simulation engine repeater for a subset of the plurality of time stamps, replacing one or more of the plurality of simulation engines with a simulation engine repeater configured to reproduce I/F communication activity from the stored I/F communication activity records corresponding to the replaced one or more of the plurality of simulation engines during the subsequent execution of the co-simulation during a period of time indicated by the subset of the plurality of time stamps; and executing the one or more plurality of simulation engines during another period of time outside of the subset of the plurality of time stamps during the subsequent execution of the co-simulation. The computer program can be stored on a non-transitory computer readable medium storing the instructions and executed by one or more processors.

Aspects of the present disclosure can include a system, which can involve means for storing interface (I/F) communication activity records of a plurality of simulation engines during execution of a co-simulation involving the plurality of simulation engines, the communication activity records associated with a plurality of time stamps; for a subsequent execution of the co-simulation indicative of replacement of one or more of the plurality of simulation engines with a simulation engine repeater for a subset of the plurality of time stamps, means for replacing one or more of the plurality of simulation engines with a simulation engine repeater configured to reproduce I/F communication activity from the stored I/F communication activity records corresponding to the replaced one or more of the plurality of simulation engines during the subsequent execution of the co-simulation during a period of time indicated by the subset of the plurality of time stamps; and means for executing the one or more plurality of simulation engines during another period of time outside of the subset of the plurality of time stamps during the subsequent execution of the co-simulation.

Aspects of the present disclosure can include a system, which can involve a memory, configured to store interface (I/F) communication activity records of a plurality of simulation engines during execution of a co-simulation involving the plurality of simulation engines, the communication activity records associated with a plurality of time stamps; and a processor, configured to, for a subsequent execution of the co-simulation indicative of replacement of one or more of the plurality of simulation engines with a simulation engine repeater for a subset of the plurality of time stamps, replace the one or more of the plurality of simulation engines with a simulation engine repeater configured to reproduce I/F communication activity from the stored I/F communication activity records corresponding to the replaced one or more of the plurality of simulation engines during the subsequent execution of the co-simulation during a period of time indicated by the subset of the plurality of time stamps; and execute the one or more plurality of simulation engines during another period of time outside of the subset of the plurality of time stamps during the subsequent execution of the co-simulation.

BRIEF DESCRIPTION OF DRAWINGS

FIG. 2 illustrates a simulator license management table, in accordance with an example implementation.

FIG. 3 illustrates an example a timing chart for the co-simulation.

FIG. 5 is an example of a timing chart of each I/F activity for each simulator, in accordance with an example implementation.

FIG. 9 illustrates another example implementation of a timing chart of each I/F activity for each simulators which have to be reproduced during the re-execution of former co-simulation.

DETAILED DESCRIPTION

Figure 1:
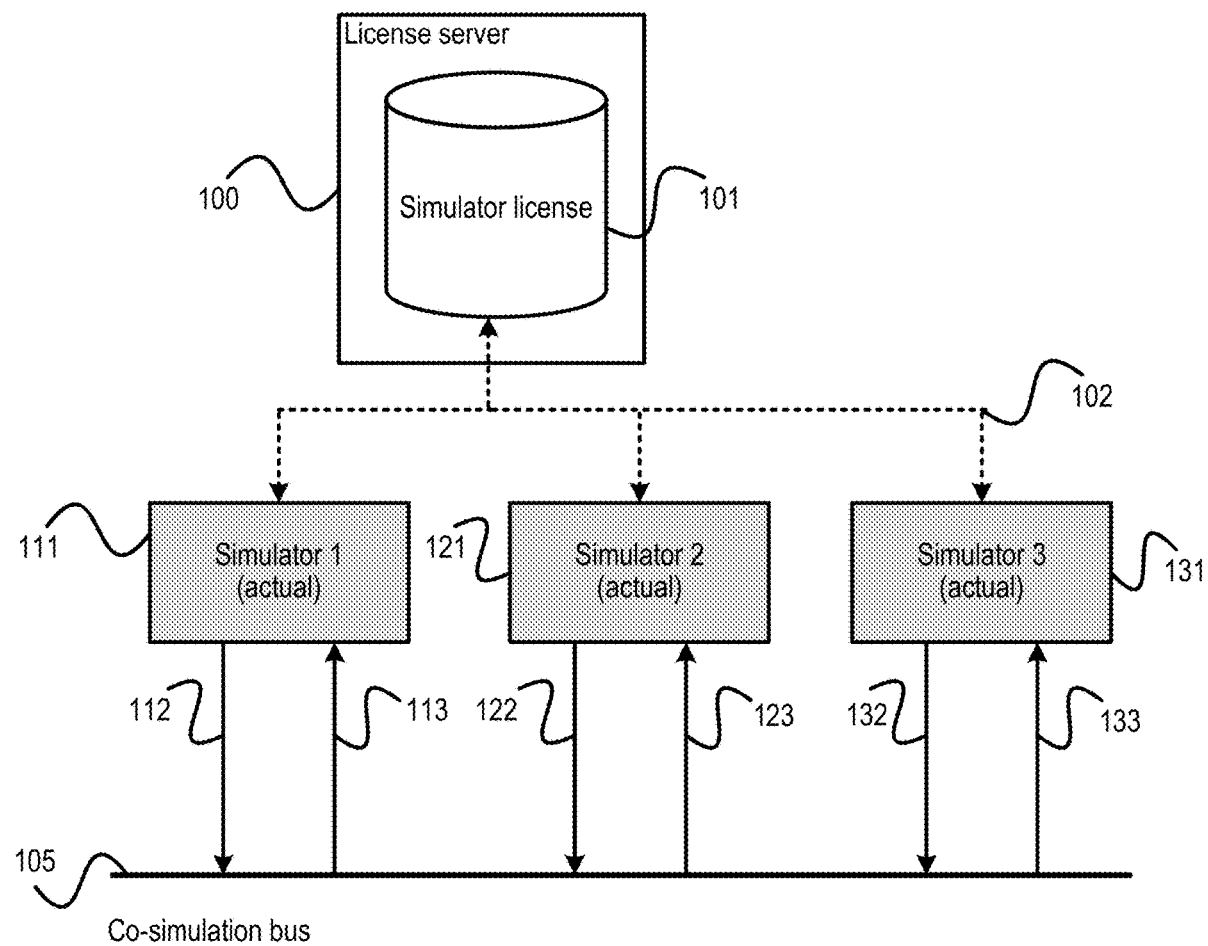
FIG. 1 illustrates a related art co-simulation platform.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In example implementations described herein, there is a storage that records each value of the I/F communication activity for each simulator for each time stamp during the full execution of a simulation, referred herein as an I/F trace. There is also dummy module(s) for each simulator in the co-simulation platform, which can reproduce the former I/F communication activity by using the I/F trace records managed by the I/F trace, and which can replace the actual simulator during the re-execution of the simulation. Further, during the re-execution, the desired simulators can be replaced in the co-simulation platform with the dummy module(s) described above, leaving the full execution for the target simulator that the user wishes to analyze and/or debug. Such dummy modules are referred herein as repeaters.

Through example implementations described herein, processing power of the underlying system can be conserved as the execution of undesired but computationally expensive simulators can be replaced with a repeater that does not consume such calculation resources. Further, the co-simulation re-execution speed can be improved, because the simulator(s) except the target simulator for debug is replaced with the dummy module which has less workload than real simulator for the execution servers, and fewer simulator licenses need to be used because the dummy module(s) replaced with the former co-simulation platform does not require such license during the re-execution term. Such implementations are particularly effective for hardware in the loop simulations (HILS) or software in the loop simulations (SILS), which can involve hardware intensive simulations requiring computationally expensive modelling environments, particularly if resource expensive algorithms or special purpose hardware is being simulated through the co-simulation bus. Example implementations described herein can be applied to HILS platforms for simulating ECUs, vehicle dynamics, usability testing and otherwise in accordance with the desired implementation, or to SILS platforms for simulating control algorithms or mechatronic systems through locally hosted compilers in accordance with the desired implementation.

FIG. 1 is an example of a related art co-simulation platform for both execution and subsequent re-execution, which involves a license server 100, simulator license storage 101, license assignment procedure 102, simulator 1 111, simulator 2 121, simulator 3 131, simulator 1 I/F (output 112, input 113), simulator 2 I/F (output 122, input 123), simulator 3 I/F (output 132, input 133) and co-simulation bus 105.

The license server 100 manages the number of simulator licenses are remaining with holding the latest license counts for each simulator in the simulator license storage 101 as shown, for example, in FIG. 2. The license server assigns an appropriate license to each simulator 111/121/131 via license assignment procedure 102, before each simulator starts co-simulation.

The simulator 1 111, simulator 2 121 and simulator 3 131 represent each part of the co-simulation model. The simulator 111/121/131 can be the same type of simulator or can be different from each other according to the desired implementation. Each simulator 111/121/131 has its own I/F input(s) and output(s), input 112 and output 113 for simulator 1 111, input 122 and output 123 for simulator 2 121, input 132 and output 133 for simulator 3 131. Input and output of each simulator can be a single signal or set of multiple signals depending on implementation. Each simulator 111/121/131 retrieves its own input values from input 112/122/132 respectively, calculates and updates its own state with its input and generates output 113/123/133 respectively after finishing the calculation and state updates, during the full execution of the co-simulation at each time step.

The co-simulation bus 105 interconnects each simulator I/F 112/113/122/123/132/133 as specified by the co-simulation model and exchanges each value from an output of a simulator to an input of other simulator, during the full execution of co-simulation at each time step. Co-simulation procedure on the platform shown in FIG. 1 is as follows.

When the actual co-simulation is invoked on the platform, each simulator 111/121/131 makes requests to the license server 100 to retrieve their respective licenses to proceed with their respective simulation via license assignment procedure 102. After the simulators retrieve their respective licenses, simulator 111/121/131 are ready for co-simulation.

FIG. 3 illustrates an example a timing chart for the co-simulation. When each simulator 111/121/131 is ready for co-simulation, co-simulation time (sim time) is set to "0" in the timing chart. At this time, the output I/F values for each simulator are set to s1o0 for output 112, s2o0 for output 122 and s3o0 for output 132 by simulator 111/121/131 respectively.

Next, co-simulation bus reads each output I/F values above and passes them to the certain input I/F for each simulator along with the specified interconnection in the model. Thus, each input I/F values for simulator 111/121/131 are set to s1i0 for input 113, s2i0 for input 123 and s3i0 for input 133 respectively.

After the initial procedure described above, sim time is set to "1", representing that the co-simulation has proceeded to the next time step. At this time, the output I/F values for each simulator are set to s1o1 for output 112, s2o1 for output 122 and s3o1 for output 132 by simulator 111/121/131 respectively, as the results of state update and output value calculation with their input in each simulator for the sim time "1".

Then, co-simulation bus reads each of the output I/F values and passes the value to the corresponding input I/F for each simulator along with the specified interconnection in the model, as described above. As the results, each input I/F values for simulator 111/121/131 are set to s1i1 for input 113, s2i1 for input 123 and s3i1 for input 133 respectively.

After the procedure described above, sim time is set to "2", representing that the co-simulation has proceeded to the next time step. At this time, the output I/F values for each simulator are set to s1o2 for output 112, s2o2 for output 122 and s3o2 for output 132 by simulator 111/121/131 respectively, as the results of state update and output value calculation with their input in each simulator for the sim time "2". The co-simulation continues in the same manner as described above until sim time reaches to specific end timing, for example in this case, sim time "n".

When sim time reaches to the end timing "n", simulator 111/121/131 and co-simulation bus 105 stop their calculations. Then, simulator 111/121/131 release their holding simulation license and return them to license server 100 via assignment procedure 102. The license server 100 updates remaining license counts described in FIG. 2 so that it can assign the simulation licenses to the other request when needed.

When the user wishes to invoke a subsequent co-simulation on the platform wherein the subsequent re-execution is to be exactly the same co-simulation to the previous execution for the purposes of reproducing the same status on simulator 111 at the sim time "n" for debugging purpose, the co-simulation procedure must be exactly the same as described before even if the subsequent execution of the co-simulation is the same as the previous co-simulation. This is because, for example, to reproduce the same status on simulator 111 at the sim time "n", the co-simulation must be invoked in the same manner as described in the previous co-simulation procedure because if there is a difference in the procedure between the previous execution and the subsequent re-execution, the status on simulator 111 at the sim time "n" may differ from each other due to having a different procedure.

Thus, in related art implementations, all simulators on the co-simulation platform must be invoked again even though it is a "re-execution" of the former co-simulation. From the co-simulation execution performance point of view, the co-simulation re-execution speed should be exactly the same as the former execution, because all elements in co-simulation platform must proceed and be invoked in the same manner as the former execution, even if the analysis target for the re-execution is only one of the simulators of the whole co-simulation platform.

Further, from a license management point of view, the number of licenses required for the re-execution should be exactly the same as the former execution, because all simulators in the co-simulation platform must be invoked. Thus, all simulators must retrieve their own execution license, even if the analysis target for the re-execution is only of the one simulators of the whole co-simulation platform.

Figure 4:
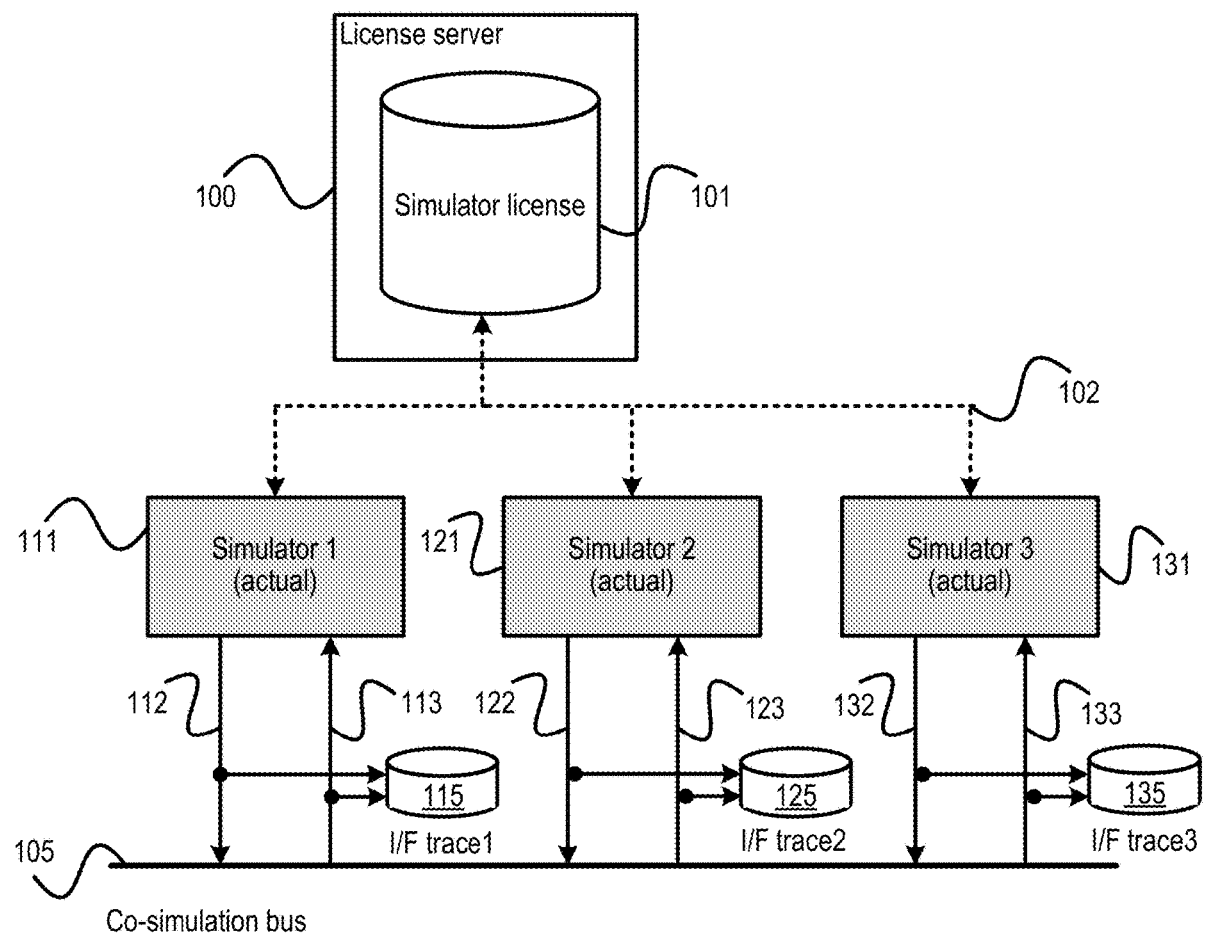
FIG. 4 is an example of a co-simulation platform in accordance with an example implementation.

Example implementations described herein are directed to addressing such problems in related art implementations. FIG. 4 is an example of a co-simulation platform with the new methodology for capturing I/F trace data at execution, in accordance with an example implementation. As illustrated in FIG. 4, the co-simulation platform can involve a license server 100, simulator license storage 101, license assignment procedure 102, simulator 1 111, simulator 2 121, simulator 3 131, simulator 1 I/F (output 112, input 113), simulator 2 I/F (output 122, input 123), simulator 3 I/F (output 132, input 133), co-simulation bus 105, storage for input and output trace of I/F on simulator 1 115, storage for input and output trace of I/F on simulator 2 125, storage for input and output trace of I/F on simulator 3 135. Each storage for input and output trace of simulator I/F monitors activity and stores input and output I/F values every sim time step. For example, I/F trace1 115 monitors output I/F of simulator 1 112 and input I/F of simulator 1 113 and stores each value of 112 and 113 for every sim time step. For the other I/F trace2 and I/F trace3, the functionality is the same with simulator 2 123 and simulator 3 131 respectively. The rest of the elements in FIG. 4 are the same as described in FIG. 1.

FIG. 5 is an example of timing chart of each I/F activity for each simulator, in accordance with an example implementation. For example above, the left most table represents the timing chart in I/F trace1 115, the middle table represents the timing chart in I/F trace2 125 and the right most table represents the timing chart in I/F trace3 135 respectively.

In an example implementation, the co-simulation procedure on the platform shown in FIG. 4 is as follows with respect to the timing chart for the co-simulation procedure of FIG. 5. When the co-simulation is invoked on the platform, the simulator 111/121/131 makes requests to the license server 100 to retrieve their respective licenses to proceed with their simulation via license assignment procedure 102. After the simulator retrieves their respective license, simulator 111/121/131 are ready for co-simulation.

When simulator 111/121/131 are ready for co-simulation, co-simulation time (sim time) is set to "0" in the timing chart. At this time, the output I/F values for each simulator are set to s1o0 for 112, s2o0 for 122 and s3o0 for 132 by simulator 111/121/131 respectively.

Next, co-simulation bus reads each of the output I/F values above and passes them to the corresponding input I/F for each simulator along with the specified interconnection in the model. Thus, each of the input I/F values for simulator 111/121/131 are set to s1i0 for 113, s2i0 for 123 and s3i0 for 133 respectively.

Meanwhile, I/F trace1 115 monitors output 112 and input 113 of simulator 1 111 and stores their values. As shown in FIG. 5, the left most chart is the timing chart of I/F trace1 115, which illustrates that I/F trace1 115 stores value s1o0 as value of output 112 and value s1i0 as value of input 113 as of sim time "0" respectively. In the middle chart, I/F trace2 125 monitors output 122 and input 123 of simulator 2 121, and stores value s2o0 as value of output 122 and value s2i0 as value of input 123 as of sim time "0" respectively. In the right most chart, I/F trace3 135 monitors output 132 and input 133 of simulator 3 131, and stores value s3o0 as value of output 132 and value s3i0 as value of input 133 as of sim time "0" respectively.

After the initial procedure described above, sim time is set to "1", representing that the co-simulation has proceeded to the next time step. At this time, the output I/F values for each simulator are set to s1o1 for 112, s2o1 for 122 and s3o1 for 132 by simulator 111/121/131 respectively, as the results of the state update and output value calculation with their input in each simulator for the sim time "1".

Then, the co-simulation bus reads each of the output I/F values above and passes them to the corresponding input I/F for each simulator along with the specified interconnection in the model, as described above. Thus, each input I/F values for simulator 111/121/131 are set to s1i1 for 113, s2i1 for 123 and s3i1 for 133 respectively.

Meanwhile, I/F trace1 115 monitors output 112 and input 113 of simulator 1 111 and stores their values. Same as former description in sim time "0", I/F trace1 115 stores value s1o1 as value of output 112 and value s1i1 as value of input 113 as of sim time "1" respectively. I/F trace2 125 monitors output 122 and input 123 of simulator 2 121, and stores value s2o1 as value of output 122 and value s2i1 as value of input 123 as of sim time "1" respectively. I/F trace3 135 monitors output 132 and input 133 of simulator 3 131, and stores value s3o1 as value of output 132 and value s3i1 as value of input 133 as of sim time "1" respectively.

After the procedure described above, sim time is set to "2", representing that the co-simulation has proceeded to the next time step. At this time, the output I/F values for each simulator are set to s1o2 for 112, s2o2 for 122 and s3o2 for 132 by simulator 111/121/131 respectively, as the results of state update and output value calculation with their input in each simulator for the sim time "2".

Meanwhile, I/F trace1 115, I/F trace2 125 and I/F trace3 135 store each input and output I/F value of their related simulator as of sim time "2", same as described before. The co-simulation continues in the same manner as described above until the sim time reaches to specific end timing, for example in this case, sim time "n".

When the sim time reaches to the end timing "n", simulator 111/121/131 and co-simulation bus 105 stop their calculation. After that, simulator 111/121/131 releases their simulation license and returns them to license server 100 via assignment procedure 102. The license server 100 updates remaining license counts described in FIG. 2 so that it can assign the simulation licenses to the other request when needed.

Figure 6:
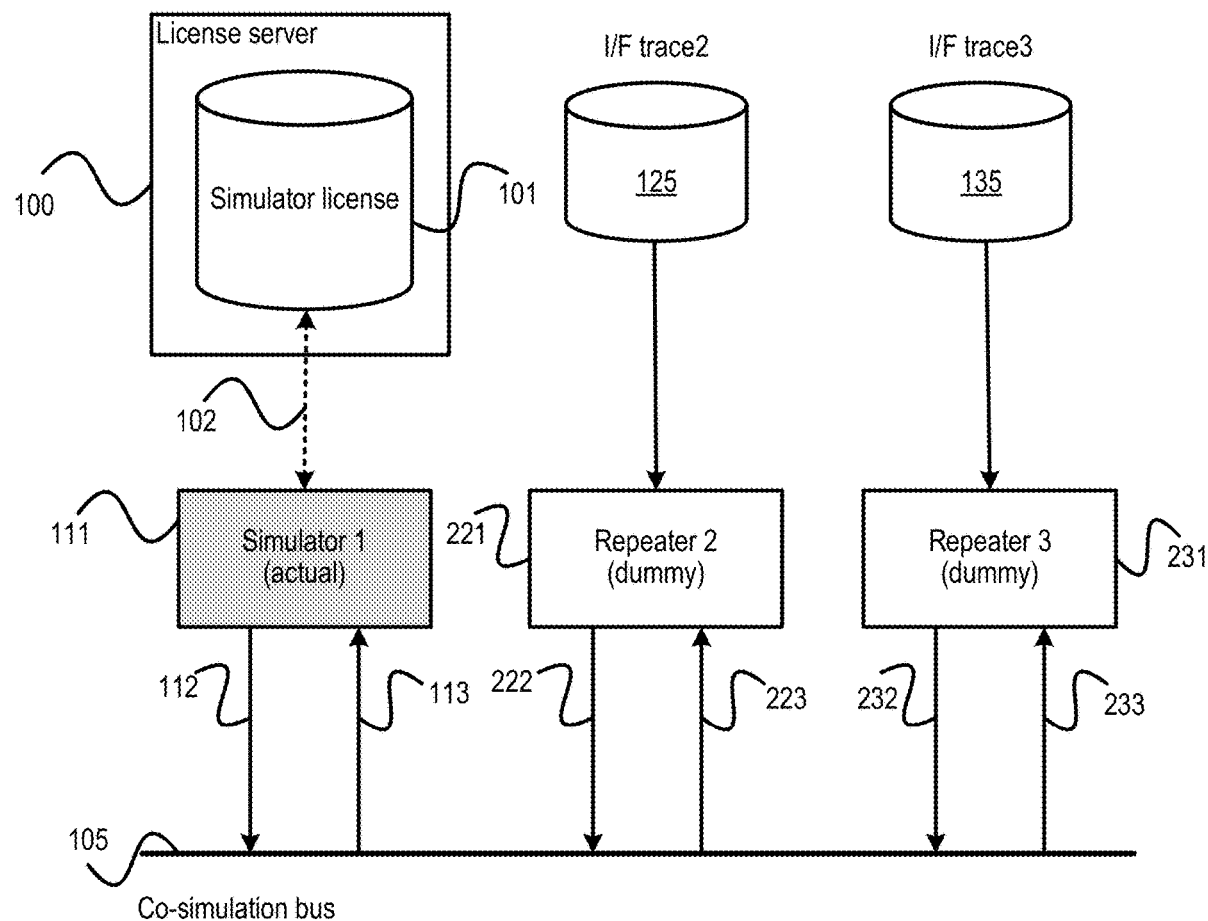
FIG. 6 is an example of co-simulation platform for re-execution, in accordance with an example implementation.

FIG. 6 is an example of co-simulation platform with the new methodology for re-execution, in accordance with an example implementation. Specifically, the co-simulation platform of FIG. 6 involves a license server 100, simulator license storage 101, license assignment procedure 102, simulator 1 111, repeater 2 221, repeater 3 231, simulator 1 I/F (output 112, input 113), simulator repeater 2 I/F (output 222, input 223), simulator repeater 3 I/F (output 232, input 233), co-simulation bus 105, storage for input and output trace of I/F on simulator 2 125, storage for input and output trace of I/F on simulator 3 135.

Repeater 2 221 and repeater 3 213 are dummy modules for replacing simulator 2 121 and simulator 3 131 respectively. Each repeater is configured to read its own storage for input and output trace of I/F every sim time and reproduce its output I/F activity along with former co-simulation execution. Repeater 2 221 reproduces output I/F activity of simulator 2 121 and repeater 3 231 reproduces output I/F activity of simulator 3 131 respectively. Each repeater added results in a lighter workload for the execution server compared to the replaced simulator, because the repeater does not involve any heavy calculations or status update procedures.

Along with these simulator replacement, output 122 and input 123 I/F of simulator 2 121 are replaced with output 222 and input 223 of repeater 2 221 respectively, and output 132 and input 133 I/F of simulator 3 131 are replaced with output 232 and input 233 of repeater 3 231 respectively. Input(s) and output(s) of each repeater can be a single signal or set of multiple signals depending on implementation.

Each storage for input and output trace of simulator I/F is result of former co-simulation execution already described above in FIG. 4 and is used as the timing chart for reproducing related simulator's input and output I/F activity. For example, I/F trace2 125 is used as the timing chart for reproducing input and output I/F activity of repeater 2 221, and I/F trace3 135 is used as the timing chart for reproducing input and output I/F activity of repeater 3 231.

The co-simulation bus 105 interconnects each simulator or repeater I/F 112/113/222/223/232/233 as specified by co-simulation model and exchanges each value from an output of a simulator to an input of a simulator, during the full execution of the co-simulation at each time step.

The rest of the elements in FIG. 6 are the same as described in FIG. 1.

Co-simulation re-execution procedure on the platform shown in FIG. 6 is as follows. When the co-simulation re-execution is invoked on the platform, the simulator 1 111 makes a request to the license server 100 to retrieve its own license to proceed with its simulation via license assignment procedure 102. After the simulator 1 111 retrieve its own license, simulator 1 111 is ready for co-simulation.

Meanwhile, repeater 2 221 and repeater 3 231 opens I/F trace2 and I/F trace3 135 which contain the timing chart of the previous co-simulation stored during the former execution. After opening them, repeater 2 221 and repeater 3 231 are ready for co-simulation. FIG. 5 is an example of the timing chart of each I/F activity for each simulator which must be reproduced during the re-execution of former co-simulation.

When simulator 1 111, repeater 2 221 and repeater 3 231 are ready for co-simulation, co-simulation time (sim time) is set to "0" in the timing chart. At this time, the output I/F values for simulator 1 111, repeater 2 221 and repeater 3 231 are set to s1o0 for 112, s2o0 for 222 and s3o0 for 232 by simulator 1 111, repeater 2 221 and repeater 3 231 respectively.

Next, co-simulation bus reads each output I/F values above and passes to the certain input I/F for each simulator along with the specified interconnection in the model. As the results, each input I/F values for simulator 1 111, repeater 2 221 and repeater 3 231 are set to s1i0 for 113, s2i0 for 223 and s3i0 for 233 respectively.

After the initial procedure described above, sim time is set to "1", representing that the co-simulation has proceeded to the next time step. At this time, the output I/F value for simulator 1 111 are set to s1o1 for 112 as the results of state update and output value calculation in each simulator for the sim time "1". The output I/F values for repeaters are set to s2o1 for 222 and s3o1 for 232 by repeater 2 221 and repeater 3 231 respectively, as the results of reading their own output trace value from storage for the sim time "1" and reproduces them to their output I/F. Then, co-simulation bus reads each output I/F values above and passes to the certain input I/F for each simulator along with the specified interconnection in the model. As the results, each of the input I/F values for simulator 1 111, repeater 2 221 and repeater 3 231 are set to s1i1 for 113, s2i1 for 223 and s3i1 for 233 respectively.

After the procedure described above, sim time is set to "2", representing that the co-simulation has proceeded to the next time step. At this time, the output I/F value for simulator 1 111 are set to s1o2 for 112 as the results of state update and output value calculation in each simulator for the sim time "2". The output I/F values for repeaters are set to s2o2 for 222 and s3o2 for 232 by repeater 2 221 and repeater 3 231 respectively, as the results of reading their own output trace value from storage for the sim time "2" and reproduces them to their output I/F.

The co-simulation continues in the same manner as described above until the sim time reaches to specific end timing, for example in this case, sim time "n". When the sim time reaches to the end timing "n", simulator 1 111, repeater 2 221 and repeater 3 231 and co-simulation bus 105 stop their calculation. After that, simulator 1 111 release its simulation license and returns it to license server 100 via assignment procedure 102. The license server 100 updates the remaining license counts as described in FIG. 2 so that it can assign the simulation licenses to the other request when needed.

Figure 7:
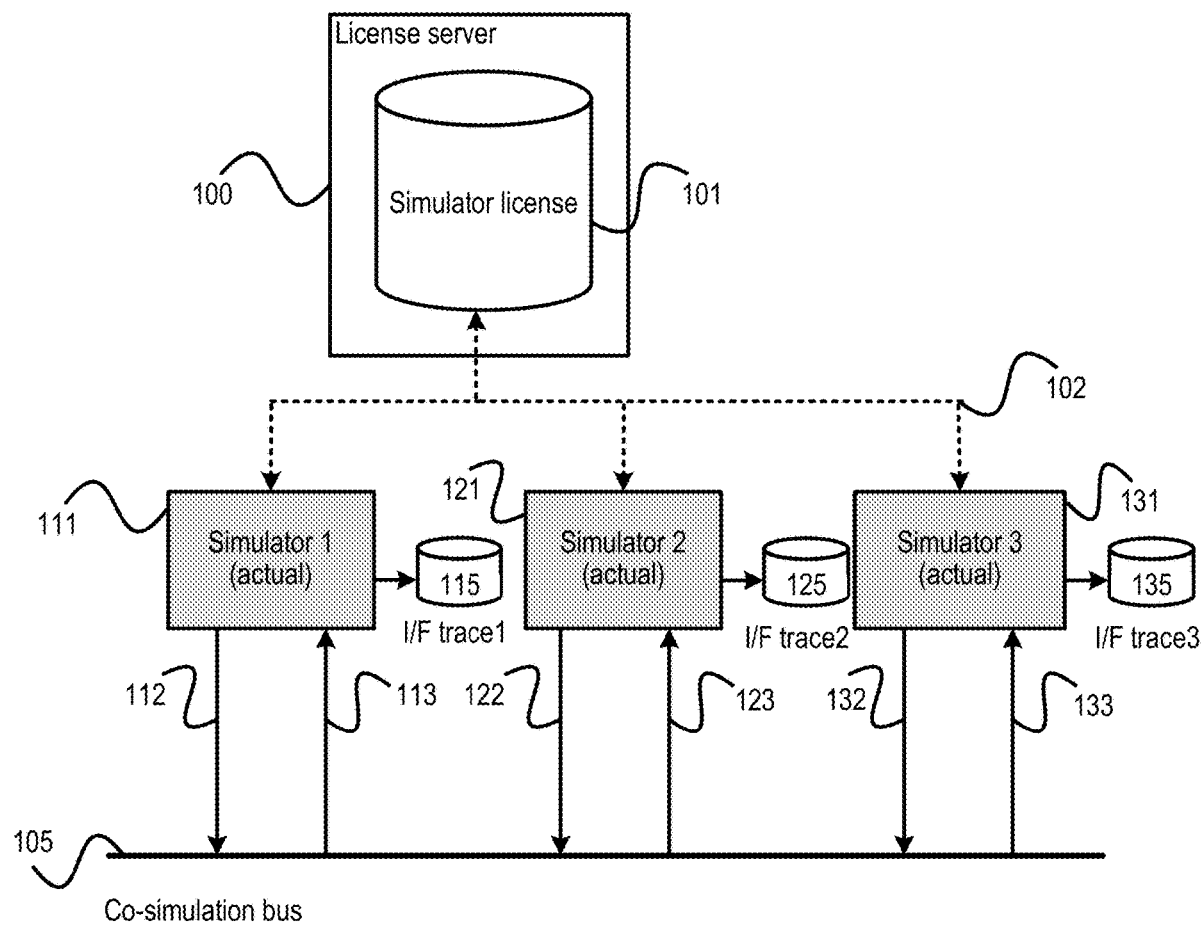
FIG. 7 illustrates another example of the co-simulation platform in accordance with an example implementation.

FIG. 7 illustrates another example of the co-simulation platform in accordance with an example implementation. In the example of FIG. 7, one or more of the simulation engines may also include functionality for storing and managing the I/F communication activity records for the I/F communication activity made by the corresponding simulation engine during the simulation. In such example implementations, the simulation engine repeater can obtain the I/F communication activity records from the data stored by the corresponding simulation engine, or the corresponding simulation engine can be executed to provide the I/F communication activity records to the repeater in accordance with the desired implementation.

Figure 8:
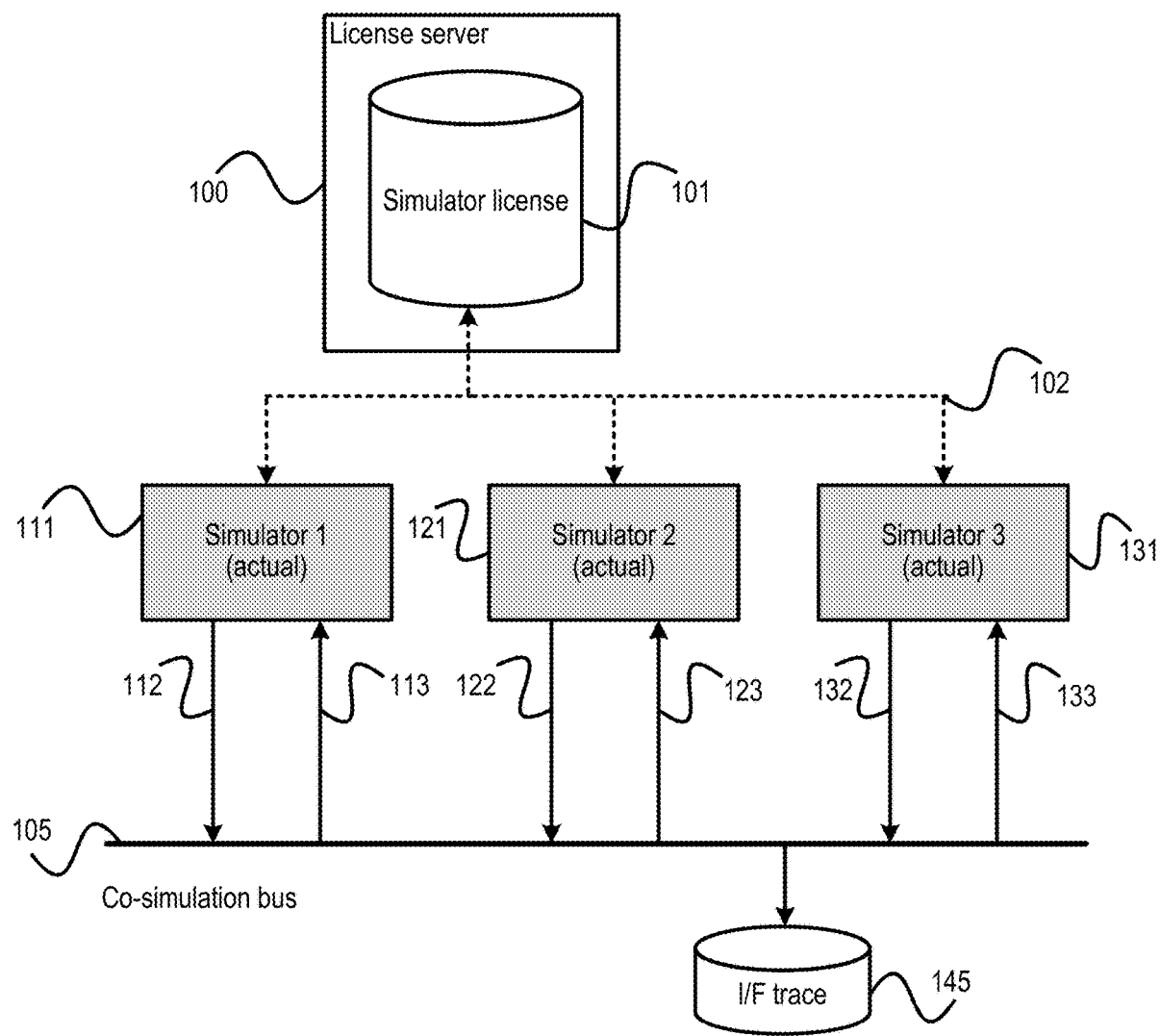
FIG. 8 illustrates another example of the co-simulation platform, in accordance with an example implementation.

FIG. 8 illustrates another example of the co-simulation platform, in accordance with an example implementation. In this example implementation, the I/F trace 145 is implemented by being interconnected to the co-simulation bus 105 and taps into the physical interconnection of the co-simulation bus 105 to record and store the I/F communication activity records. Such an example implementation can be facilitated by a dedicated hardware system that involves dedicated memory to manage the I/F communication activity records, and one or more programmable hardware chips such as a Field Programmable Gate Array (FPGA) specifically dedicated and programmed to provide the corresponding I/F communication activity record to a repeater. Depending on the desired implementation, the one or more programmable chips may also be specifically dedicated and programmed to facilitate the functionality of the repeater as well. Such an implementation may be desirable if the simulation engine is integrated into an external special purpose apparatus that is plugged into the co-simulation bus 105 (e.g., from an external Internet of Things (IoT) device that connects to the co-simulation device via Ethernet as connected to the bus, from specific external devices such as kiosks, printers, input devices, and other devices that are physically connected to the bus, and so on according to the desired implementation).

Figure 10:
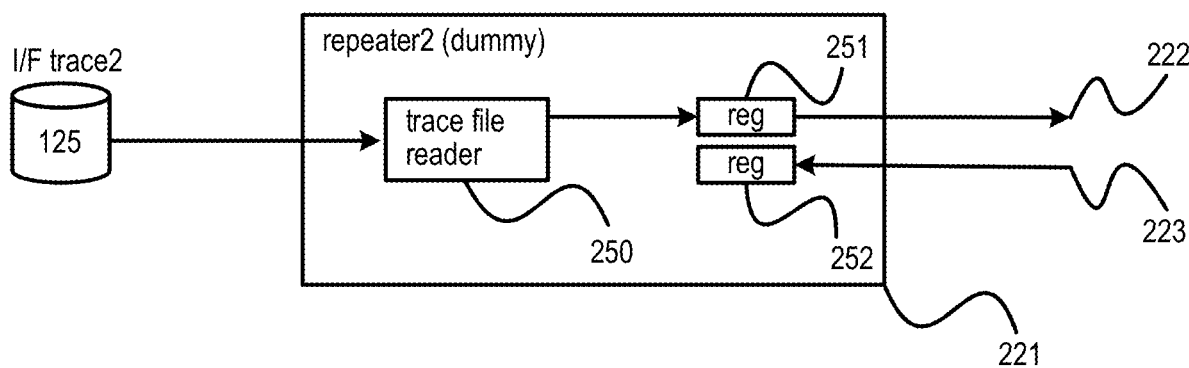
FIG. 10 illustrates an example of a repeater, in accordance with an example implementation.

FIG. 9 illustrates another example implementation of a timing chart of each I/F activity for each simulators which have to be reproduced during the re-execution of former co-simulation. The example timing chart indicating the I/F communication activity can be implemented for any I/F trace implementation described herein in accordance with the desired implementation FIG. 10 illustrates an example of a repeater, in accordance with an example implementation. In the example implementation of FIG. 10, the repeater includes a trace file reader 250 which is configured to retrieve the I/F activity data from the co-simulation trace, (e.g., before the co-simulation execution). Register 251 is used to time stamp the output for the output interface 222. Register 252 is used to time stamp the input received through input interface 223.

Figure 11:
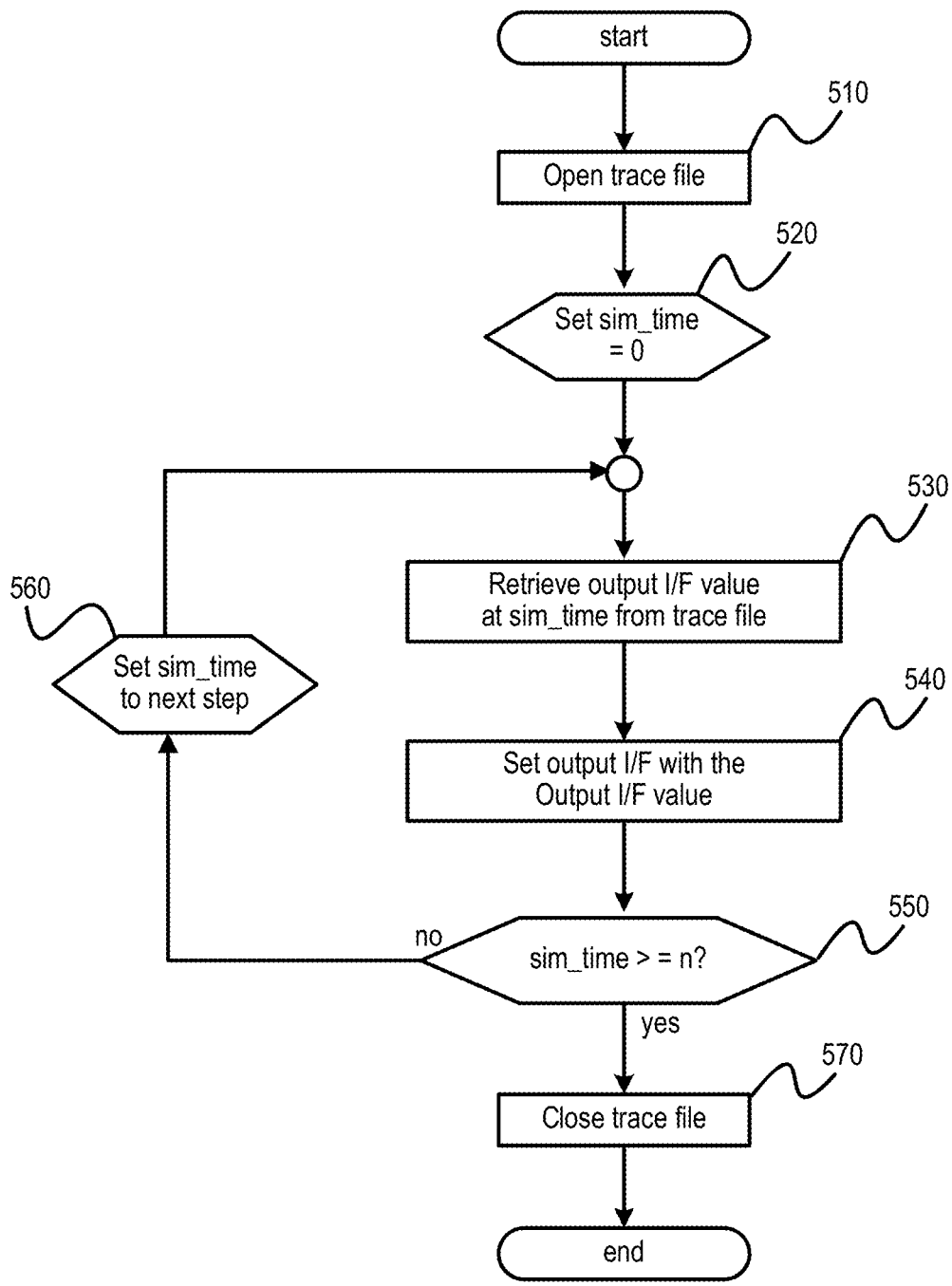
FIG. 11 illustrates a flow diagram for a repeater, in accordance with an example implementation.

FIG. 11 illustrates a flow diagram for a repeater, in accordance with an example implementation. At 510, the repeater opens the trace file containing the I/F communication activity records. Such a file can be provided from the simulation engine or software application, from a software application executed in the background that retrieves it from memory, from the repeater retrieving the trace file from memory, or from the memory within the dedicated hardware system of the repeater in accordance with the desired implementation.

At 520, the starting point of the repeater is initialized. For example, when the repeater is to replace the simulation engine or software application in its entirety, the starting point can be initialized to time=0. If it is to be implemented as a replacement for only a portion of the simulation, then the starting point is initialized at the particular point in time provided for replacement (e.g., by a user through the interface). Then, the repeater initiates a loop to retrieve a corresponding record from the I/F communication activity records for the particular point in time within the loop at 530.

At 540, the repeater sets the output I/F with the output I/F value from the I/F communication activity records for the particular point in time within the loop. At 550, a check is performed to determine if the repeater has reached the end of its requirement n for providing I/F communications. For example, if the repeater is to replace the simulation engine or software application in its entirety, then n is the time stamp associated with the end of the simulation or co-execution of software applications. If it is to be implemented as a replacement for only a portion of the simulation, then n is set to the ending point according to the time stamp associated with the desired end of the simulation or co-execution (e.g., as defined through a user interface). If so (Yes), then the flow proceeds to 570 whereupon the repeater closes the trace file and the flow ends. Otherwise (No), the flow proceeds to 560 to proceed to the next timestamp of the simulation or co-execution of software applications.

Through the example implementation of FIG. 11, the repeater can be configured to replace the simulation engine or the software application for the entire duration of the simulation or co-execution, or for a desired subset of the plurality of time stamps corresponding to the desired I/F communication activity of the simulation or the co-execution.

Figure 12:
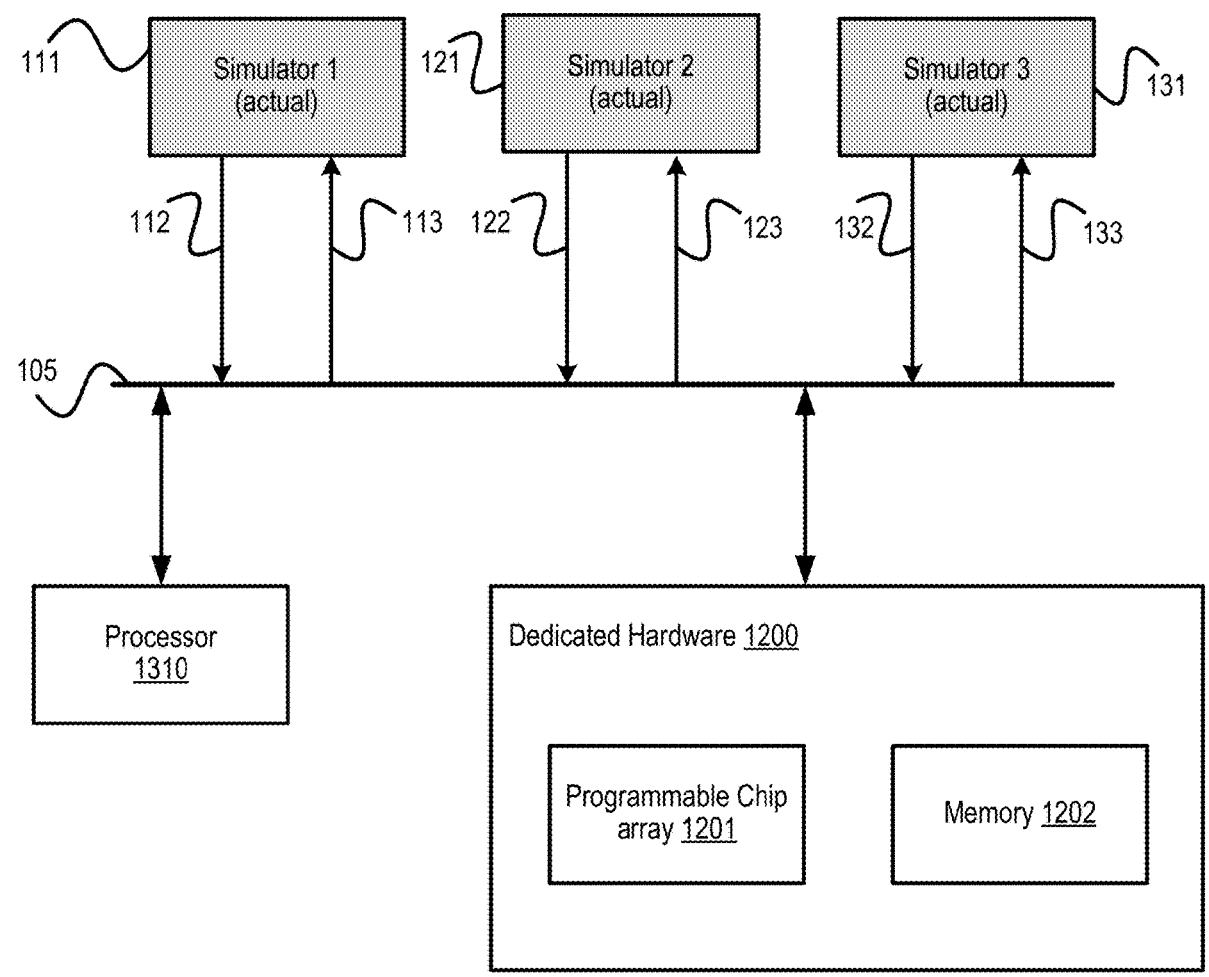
FIG. 12 illustrates an example dedicated hardware system for facilitating the I/F trace and/or the repeater, in accordance with an example implementation.

FIG. 12 illustrates an example dedicated hardware system for facilitating the I/F trace and/or the repeater, in accordance with an example implementation. In an example implementation, the co-simulation bus 105 is connected to a processor 1310, and a dedicated hardware system 1200. The dedicate hardware system 1200 is physically connected to the co-simulation bus 105 and involves one or more programmable chips 1201, and a memory 1202 configured to facilitate the I/F trace functions as described herein. For example, the memory 1202 can be configured to manage the timing charts described herein to maintain records of the I/F communication activity between the simulators 111/121/131. Depending on the desired implementation, the one or more programmable chips 1201 can be programmed to conduct the functionality of the I/F trace to tap the co-simulation bus 105 and feed the I/F communication activity to the memory 1202. The one or more programmable hardware chips 1201 can also be programmed to conduct functionality of the repeater as illustrated in FIG. 10 to provide I/F communication activity for the replaced one or more simulators during the appropriate time stamp. The one or more programmable hardware chips 1201 can be dedicated processors such as Field Programmable Gate Array (FPGA) to reduce the load on processor 1310 and co-simulation bus 105.

Figure 13:
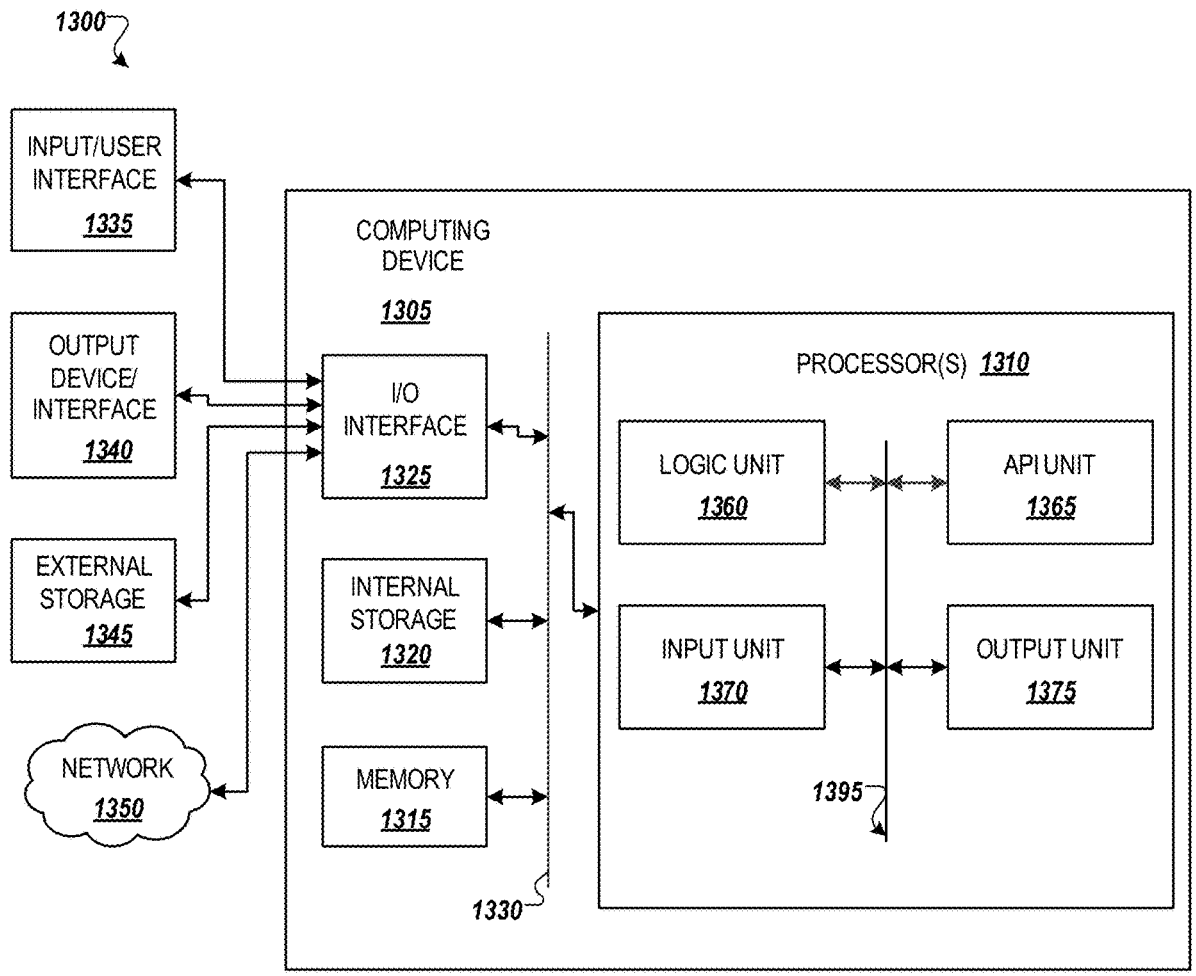
FIG. 13 illustrates an example computing environment with an example computer device suitable for use in example implementations.

FIG. 13 illustrates an example computing environment with an example computer device suitable for use in example implementations, such as an execution server or personal computer configured to execute or facilitate the functionality herein. Computer device 1305 in computing environment 1300 can include one or more processing units, cores, or processors 1310, memory 1315 (e.g., RAM, ROM, and/or the like), internal storage 1320 (e.g., magnetic, optical, solid state storage, and/or organic), and/or I/O interface 1325, any of which can be coupled on a communication mechanism or bus 1330 for communicating information or embedded in the computer device 1305.

Computer device 1305 can be communicatively coupled to input/user interface 1335 and output device/interface 1340. Either one or both of input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305. In example implementations involving a touch screen display, a television display, or any other form of display, the display is configured to provide a user interface.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via I/O interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

I/O interface 1325 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Memory 1315 may be configured to store or manage algorithms to be executed by processor(s) 1310 as described in the flow, for example, of FIG. 11 along with the data to be processed, such as data as illustrated in FIGS. 2, 3, 5 and 9. The example implementations as described herein may be conducted singularly, or in any combination of each other according to the desired implementation and are not limited to a particular example implementation.

Processor(s) 1310 can execute under any operating system (OS) (not shown), in a native or virtual environment. One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided. Processor(s) 1310 can be in the form of physical processors or central processing units (CPU) that is configured to execute instructions loaded from Memory 1315.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, input unit 1370, output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide output based on the calculations described in example implementations.

In example implementations, processor(s) 1310 can be configured to store interface (I/F) communication activity records of a plurality of simulation engines during execution of a co-simulation involving the plurality of simulation engines; and for a subsequent execution of the co-simulation, replace one or more of the plurality of simulation engines with a simulation engine repeater configured to reproduce I/F communication activity from the stored I/F communication activity records corresponding to the replaced one or more of the plurality of simulation engines during the subsequent execution of the co-simulation as illustrated in FIGS. 4 to 6.

In example implementations, processor(s) 1310 can be configured to execute the co-simulation by obtaining a simulation license for each of the plurality of simulation engines, wherein the subsequent execution of the co-simulation involves obtaining the simulation license for ones of the plurality of simulation engines other than the replaced one or more of the plurality of simulation engines as described in FIGS. 4 to 6. As the repeaters do not require a license, the simulation license for the repeaters do not need to be obtained, and can be used for other purposes according to the desired implementation.

In example implementations, at least a subset of the plurality of simulation engines are instances of a same simulation engine. For example, simulation engines can be run on instances of VDK, Saber, Matlab, or other simulation engines in accordance with the desired implementation. However, in some implementations there may be a desire to execute multiple instances of the same simulation engine (e.g., run multiple instances of Matlab). In such an implementation, the simulation would involve instances of the same simulation engine, wherein the repeaters can be used for some or all of the instances of the same simulation engine in accordance with the desired implementation.

Depending on the desired implementation, processor(s) 1310 execute a software application in the background during the co-simulation, wherein the storing of the I/F communication activity records of the one or more of the plurality of simulation engines is conducted by the software application. In such an example implementation, the stand alone software application provides the I/F communication activity records from the stored I/F communication activity records corresponding to the replaced one or more of the plurality of simulation engines to the simulation engine repeater for reproduction as illustrated in FIG. 6.

Depending on the desired implementation, the simulation engine may have a function to conduct storing of I/F communication activity as illustrated in FIG. 7. In such an implementation, the simulation engine can be instructed to execute the function so that the storing of the I/F communication activity of the one or more of the plurality of simulation engines is conducted by the corresponding one or more of the plurality of simulation engines.

Depending on the desired implementation, the functions of the processor(s) 1310 can also be implemented in a dedicated hardware system as illustrated in FIG. 12. In such an example implementation, the programmable chip array 1201 contains dedicated programmed hardware configured to conduct the storing of the I/F communication activity records corresponding to the replaced one or more of the plurality of simulation engines, wherein the dedicated hardware system provides the I/F communication activity records from the stored I/F communication activity records corresponding to the replaced one or more of the plurality of simulation engines to the simulation engine repeater for reproduction.

Further, depending on the desired implementation, the repeaters can be executed for only a subset of the simulation, and then the simulation engine is engaged for the remaining durations of the simulation. For example, a subset of the plurality of time stamps of the simulation from the timing chart can be specified for utilization of the repeater through the use of an interface in accordance with the desired implementation. When the subset of the plurality of time stamps is specified, then the one or more of the plurality of simulation engines are replaced with the simulation engine repeater configured to reproduce I/F communication activity from the stored I/F communication activity records corresponding to the replaced one or more of the plurality of simulation engines during the subsequent execution of the co-simulation during a period of time indicated by the subset of the plurality of time stamps. In such an example implementation, the repeaters are engaged for any subset of time for the simulation in accordance with the desired implementation.

As described in the present disclosure, through the example implementations described herein, only one target simulator for debugging needs to be invoked again, and the rest of the simulators are replaced with repeaters during re-execution of the former co-simulation.

From the perspective of the co-simulation execution performance, the co-simulation re-execution speed will be faster because only a subset of the simulators in the co-simulation platform are invoked and rest of the platform are replaced with repeaters which require fewer computational resources from the execution servers.

Further, from the perspective of license management, the number of licenses required for the re-execution is reduced because only a subset of the simulators in the co-simulation platform require an execution license and the rest of the platform are replaced with repeaters which do not require such an execution license. The execution license for such simulators can thereby be repurposed for other simulations.

The co-simulation methodology can be utilized by both software and hardware development scenes and are not limited to the areas such as firmware development and control logic designing because the simulators described above can be replaced to any type of application software which have co-execution features involving interactive I/F communication.

Although example implementations are described herein with respect to simulation engines, the implementations can also be extended to general software applications that produce I/F communication activity and that can be co-executed. Examples of such software applications can include, but are not limited to, database applications configured to retrieve data from a proprietary database, debugging trace software, Ethernet or interne facing applications that retrieve and provide data over external connections in accordance with a desired implementation. Accordingly, the software applications may be replaced by a software application repeater configured to reproduce such I/F communication activity in accordance with the example implementations described herein, and corresponding licenses can be retrieved from a licensing server managing the licenses for such software applications. Software applications can also be concurrently executed with simulation engines (e.g., software applications that retrieve and provide data from a proprietary database to the simulation engines), or the co-execution can involve only software applications, or otherwise in accordance with the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
  storing interface (I/F) communication activity records of a plurality of simulation engines during execution of a co-simulation involving the plurality of simulation engines; and
  for a subsequent execution of the co-simulation, replacing one or more of the plurality of simulation engines with a simulation engine repeater configured to reproduce I/F communication activity from the stored I/F communication activity records corresponding to the replaced one or more of the plurality of simulation engines during the subsequent execution of the co-simulation.

2. The method of claim 1, wherein the execution of the co-simulation comprises obtaining a simulation license for each of the plurality of simulation engines;
  wherein the subsequent execution of the co-simulation comprises obtaining the simulation license for ones of the plurality of simulation engines other than the replaced one or more of the plurality of simulation engines.

3. The method of claim 1, wherein at least a subset of the plurality of simulation engines are instances of a same simulation engine.

4. The method of claim 1, wherein the storing of the I/F communication activity records of the one or more of the plurality of simulation engines is conducted by a software application executed in a background during the co-simulation; and
  wherein the software application provides the I/F communication activity records from the stored I/F communication activity records corresponding to the replaced one or more of the plurality of simulation engines to the simulation engine repeater for reproduction.

5. The method of claim 1, wherein the storing of the I/F communication activity of the one or more of the plurality of simulation engines is conducted by the corresponding one or more of the plurality of simulation engines.

6. The method of claim 1, wherein the one or more of the plurality of simulation engines are interconnected by an I/F bus that is connected to a dedicated hardware system configured to conduct the storing of the I/F communication activity records corresponding to the replaced one or more of the plurality of simulation engines;

wherein the dedicated hardware system provides the I/F communication activity records from the stored I/F communication activity records corresponding to the replaced one or more of the plurality of simulation engines to the simulation engine repeater for reproduction.

7. A method, comprising:

storing interface (I/F) communication activity records of a plurality of software applications that communicate with another software application over I/F during co-execution the plurality of software applications; and for a subsequent co-execution, replacing one or more of the plurality of software applications with a software application repeater configured to reproduce I/F communication activity from the stored I/F communication activity records corresponding to the replaced one or more of the plurality of software applications during the subsequent co-execution.

8. The method of claim 7, wherein the co-execution comprises obtaining a software license for each of the plurality of software applications;

wherein the subsequent co-execution comprises obtaining the software license for ones of the plurality of software applications other than the replaced one or more of the plurality of software applications.

9. The method of claim 1, wherein at least a subset of the plurality of software applications are instances of a same software application.

10. The method of claim 1, wherein the storing of the I/F communication activity records of the one or more of the plurality of software applications is conducted by a separate software application executed in a background during the co-simulation; and wherein the separate software application provides the I/F communication activity records from the stored I/F communication activity records corresponding to the replaced one or more of the plurality of software applications to the software application repeater for reproduction.

11. The method of claim 1, wherein the storing of the I/F communication activity of the one or more of the plurality of software applications is conducted by the corresponding one or more of the plurality of software applications.

12. The method of claim 1, wherein the one or more of the plurality of software applications are interconnected by an I/F bus that is connected to a dedicated hardware system configured to conduct the storing of the I/F communication activity records corresponding to the replaced one or more of the plurality of software applications;

wherein the dedicated hardware system provides the I/F communication activity records from the stored I/F communication activity records corresponding to the replaced one or more of the plurality of software applications to the software application repeater for reproduction.

13. A method, comprising:

storing interface (I/F) communication activity records of a plurality of simulation engines during execution of a co-simulation involving the plurality of simulation engines, the communication activity records associated with a plurality of time stamps;

for a subsequent execution of the co-simulation indicative of replacement of one or more of the plurality of simulation engines with a simulation engine repeater for a subset of the plurality of time stamps, replacing the one or more of the plurality of simulation engines with the simulation engine repeater configured to reproduce I/F communication activity from the stored I/F communication activity records corresponding to the replaced one or more of the plurality of simulation engines during the subsequent execution of the co-simulation during a period of time indicated by the subset of the plurality of time stamps; and executing the one or more plurality of simulation engines during another period of time outside of the subset of the plurality of time stamps during the subsequent execution of the co-simulation.

14. The method of claim 13, wherein the execution of the co-simulation comprises obtaining a simulation license for each of the plurality of simulation engines;

wherein the subsequent execution of the co-simulation comprises obtaining the simulation license for ones of the plurality of simulation engines other than the replaced one or more of the plurality of simulation engines during the period of time indicated by the subset of the plurality of time stamps.

15. The method of claim 13, wherein at least a subset of the plurality of simulation engines are instances of a same simulation engine.

16. The method of claim 13, wherein the storing of the I/F communication activity records of the one or more of the plurality of simulation engines is conducted by a software application executed in a background during the co-simulation; and wherein the software application provides the I/F communication activity records from the stored I/F communication activity records corresponding to the replaced one or more of the plurality of simulation engines to the simulation engine repeater for reproduction during the period of time indicated by the subset of the plurality of time stamps.

17. The method of claim 13, wherein the storing of the I/F communication activity of the one or more of the plurality of simulation engines is conducted by the corresponding one or more of the plurality of simulation engines.

18. The method of claim 13, wherein the one or more of the plurality of simulation engines are interconnected by an I/F bus that is connected to a dedicated hardware system configured to conduct the storing of the I/F communication activity records corresponding to the replaced one or more of the plurality of simulation engines;

wherein the dedicated hardware system provides the I/F communication activity records from the stored I/F communication activity records corresponding to the replaced one or more of the plurality of simulation engines to the simulation engine repeater for reproduction during the period of time indicated by the subset of the plurality of time stamps.

\* \* \* \* \*